United States Patent [19]

Suda et al.

[11] Patent Number: 5,739,858
[45] Date of Patent: Apr. 14, 1998

[54] AUTOMATIC FOCUSING DEVICE USING A PLURALITY OF DIFFERENT FREQUENCY COMPONENTS EXTRACTED AT THE SAME POINT

[75] Inventors: Hirofumi Suda, Yokohama; Hideyuki Arai, Kawasaki, both of Japan

[73] Assignee: Canon Kabushiki Kaisha, Tokyo, Japan

[21] Appl. No.: 309,555

[22] Filed: Sep. 20, 1994

Related U.S. Application Data

[63] Continuation of Ser. No. 874,592, Apr. 27, 1992, abandoned.

[30] Foreign Application Priority Data

May 2, 1991 [JP] Japan ............... 3-100738

[51] Int. Cl.$^6$ ............... G03B 13/00; H04N 5/232
[52] U.S. Cl. ............... 348/355; 348/353
[58] Field of Search ............... 348/345, 348, 348/353–356, 361, 362; 354/408; 395/124, 125; H04N 5/232

[56] References Cited

U.S. PATENT DOCUMENTS

| | | | |
|---|---|---|---|
| 4,851,657 | 7/1989 | Taniguchi et al. | 354/408 |
| 4,853,788 | 8/1989 | Marashima et al. | 348/355 |
| 4,922,346 | 5/1990 | Hidaka et al. | 348/355 |
| 4,980,773 | 12/1990 | Suda et al. | 358/227 |
| 5,055,933 | 10/1991 | Hidake | 348/356 |
| 5,070,353 | 12/1991 | Komiya et al. | 354/402 |
| 5,115,262 | 5/1992 | Komiya | 354/402 |
| 5,150,217 | 9/1992 | Senuma et al. | 358/227 |
| 5,212,516 | 5/1993 | Yamada et al. | 348/354 |
| 5,218,444 | 6/1993 | Mizutani et al. | 358/227 |
| 5,357,280 | 10/1994 | Yajima et al. | 348/355 |
| 5,475,429 | 12/1995 | Kodama | 348/355 |
| 5,638,122 | 6/1997 | Kawaguchi et al. | 348/349 |

FOREIGN PATENT DOCUMENTS

| | | | |
|---|---|---|---|
| 0297587 | 4/1989 | European Pat. Off. | H04N 5/232 |
| 87144 | 7/1980 | Japan | G02B 7/11 |
| 41277 | 2/1986 | Japan | H04N 5/232 |
| 127217 | 5/1988 | Japan | G02B 7/11 |
| 1137886 | 5/1989 | Japan | H04N 5/232 |

*Primary Examiner*—Bipin Shalwala
*Attorney, Agent, or Firm*—Robin, Blecker & Daley

[57] ABSTRACT

Disclosed herein is an automatic focusing device including a plurality of extraction means for extracting different frequency components from among image pickup signals outputted by image pickup means, driving direction decision means for deciding the driving direction of a focusing lens based on the signal extracted by the extraction means, detection means for detecting a focusing signal in correspondence with the degree of focusing by dividing a signal at the same point which is extracted by the extraction means, driving speed decision means for deciding the driving speed of the focusing lens based on the detection means, and driving means for driving the focusing lens of optical system to the focusing point based on the driving direction decision means and the driving speed decision means.

39 Claims, 9 Drawing Sheets

1: OBJECT WITH LOW CONTRAST
2: NORMAL OBJECT
3: OBJECT WITH HIGH CONTRAST

5,739,858

AUTOMATIC FOCUSING DEVICE USING A PLURALITY OF DIFFERENT FREQUENCY COMPONENTS EXTRACTED AT THE SAME POINT

This is a continuation application under 37 CFR 1.62 of prior application Ser. No. 07/874,592 filed on Apr. 27, 1992 (abandoned).

BACKGROUND OF THE INVENTION

1. Field of the Invention

This invention relates to an automatic focusing device suitable for use with a video camera and the like.

2. Related Background Art

As an automatic focusing device used in a movie camera such as video camera or the like, there has been known an automatic focusing device called mountain-climbing type in which high frequency components are extracted from image signals obtained from an image pickup element such as CCD and others and a photographing lens is driven so as to make the extracted high frequency components maximum to perform optimum focusing. Such automatic focusing system as this is generally recognized as having such advantages that no specific optical focusing member is required and precise focusing can be achieved independently of a distance up to an object, and will be explained in detail by referring to FIG. 1.

In FIG. 1, a focusing lens 1 is moved in the direction of the optical axis by a focusing motor 6 to perform a focusing operation. Light passed through the lens 1 is imaged on an image picking-up plane of an image pickup element 2, photo-electrically converted into an electric signal and outputted as a video signal. This video signal is amplified up to the required level by an amplifier 3, converted into a standard television signal by a process circuit 4 for a camera. Simultaneously with this, the output of the amplifier 3 is applied to a band-pass filter (hereinafter referred to as BPF) 8. In BPF 8, the high frequency components among the video signal are extracted, and then only the video signal corresponding to a focusing detection region set in a portion of a screen is extracted at a gate circuit 9. A peak-hold circuit 10 implements a peak-hold operation at an interval synchronized with an integral multiple of a vertical sync signal. Hereinafter, this peak-held value will be referred to as focal point voltage value B.

A motor speed decision circuit 12 sets a speed of the focusing motor 6 in correspondence with the degree of focusing based on the focal point voltage value B. In other words, the speed of motor 6 is varied through a motor driver 7 in such a manner that it becomes fast when the lens is excessively out of focus or it becomes slow when the out-of-focus condition is small. A motor direction decision circuit 11 sets a running of the motor in the direction that the focal point voltage value B increases, according to a method well known in the art as mountain-climbing control. However, the motor direction decision circuit 11 at the start of operation drives the motor, for the time being, in an appropriate direction since the direction that maximizes the focal point voltage value B is not known at the beginning, and continues to drive it until the direction thereof can be judged. If the lens 1 reaches its extreme end during the period of judgement, a focus encoder 5 detects it and instructs to reverse the direction of motor 6.

However, as clearly estimated from the conventional example mentioned above, there was a problem that the degree of focusing may not be accurately judged since the focal point voltage varies not only due to the out-of-focusing or defocusing condition of an object, but also the type or contrast thereof.

In short, in the case of ordinary objects, no hunting occurs and high-speed automatic focusing operation was achieved by making the speed of motor fast when the lens is out of focus excessively and slow when the defocusing condition is small according to the instructions from the motor speed decision circuit 12. However, in the case of an object with low contrast, it was not possible to retard the motor speed even when the out-of-focus condition is small because the focal point voltage is low, thus leading to repetitive hunting in the vicinity of focal point. On the other hand, in the case of high contrast, the speed of motor at the time of excessive defocusing condition was reduced due to high focal point voltage, so that it took a long time until a focal point is obtained.

SUMMARY OF THE INVENTION

This invention has been made to eliminate the above-mentioned drawbacks, and a primary object of which is to provide an automatic focusing device capable of rapid focusing without hunting, regardless of the type of object to be photographed.

It is another object of the present invention to provide an automatic focusing device which can be precisely focused without being effected by the type of object and contrast.

In order to accomplish such objects as mentioned above, according to one preferred embodiment of the present invention, there is disclosed an automatic focusing device comprising a plurality of extraction means for extracting different frequency components at the same point within an image pickup signal outputted by image pickup means, detection means for detecting a focusing signal in correspondence with the degree of focusing through division of the signal extracted by the extraction means, and driving means for driving a focusing lens to a focusing point based on the output of the detection means.

Similarly, in order to achieve the objects of the present invention, according to another preferred embodiment of the present invention, there is disclosed an automatic focusing device comprising a plurality of extraction means for extracting different frequency components from among the image pickup signal outputted by the image pickup means, driving direction decision means for determining the driving direction of a focusing motor based on the signal extracted by the extraction means, detection means for detecting a focusing signal in correspondence with the degree of focusing through arithmetic operation on a signal at the same point which is extracted by the extraction means, driving speed decision means for deciding the speed of a focusing motor based on the detection means, and driving means for driving the focusing lens of an optical system to the focusing point based on the driving speed decision means and the driving direction decision means.

In addition, according to yet another preferred embodiment of the present invention, there is disclosed an automatic focusing device capable of driving a focusing lens to the focusing point by first deciding the driving direction of the focusing lens based on the signal extracted from among the image pickup signals by the plurality of extraction means, then detecting the focusing signal corresponding to the degree of focusing through division of the extraction signal, and finally deciding the driving speed of the focusing lens based on the above-mentioned signal.

BRIEF DESCRIPTION OF THE DRAWINGS

The foregoing and other objects, features and advantages of the present invention will be apparent after considering several illustrative embodiments, taken in conjunction with the drawings, in which.

DETAILED DESCRIPTION OF THE PREFERRED EMBODIMENTS

Hereinafter, several preferred embodiments of the present invention will be described in connection with the drawings.
(Embodiment: 1)

Figure 1:
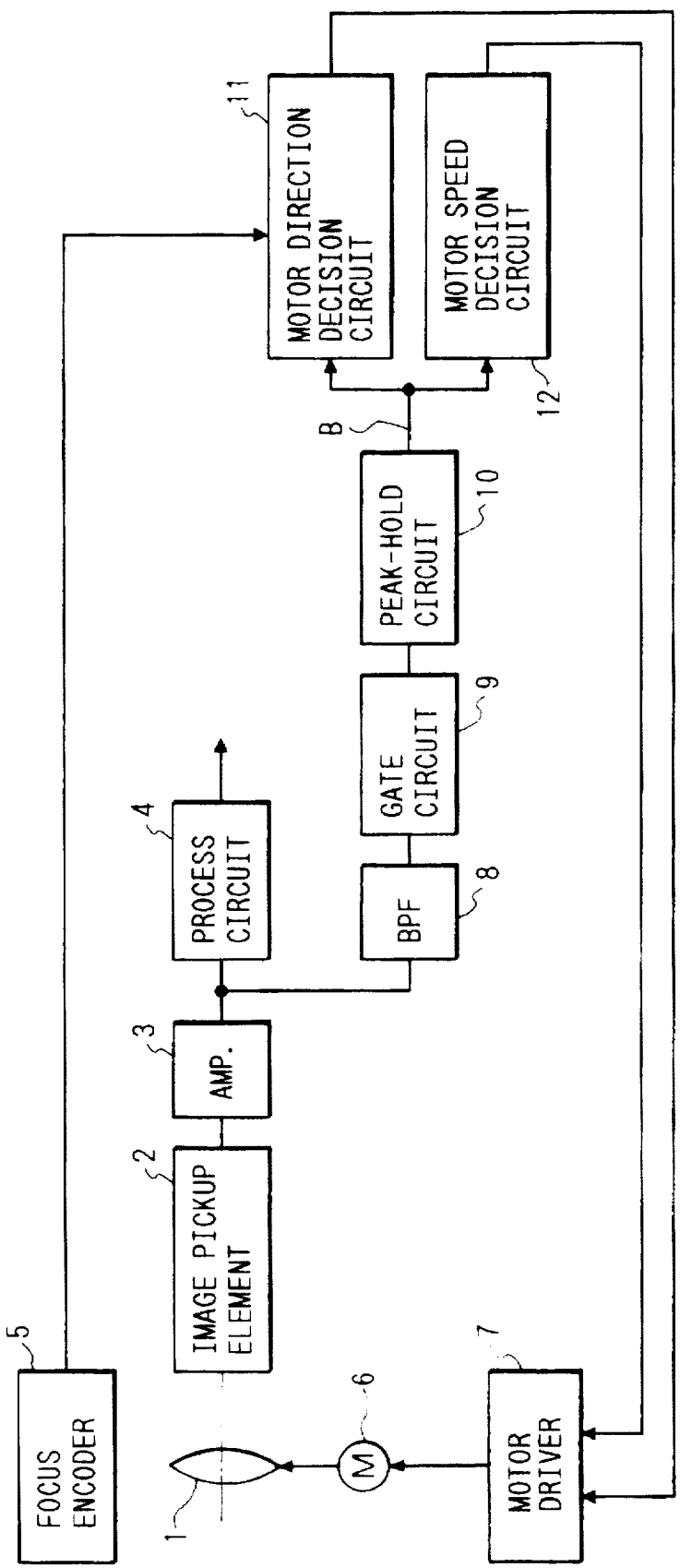
FIG. 1 shows a block diagram of an ordinary AF system.
Figure 2:
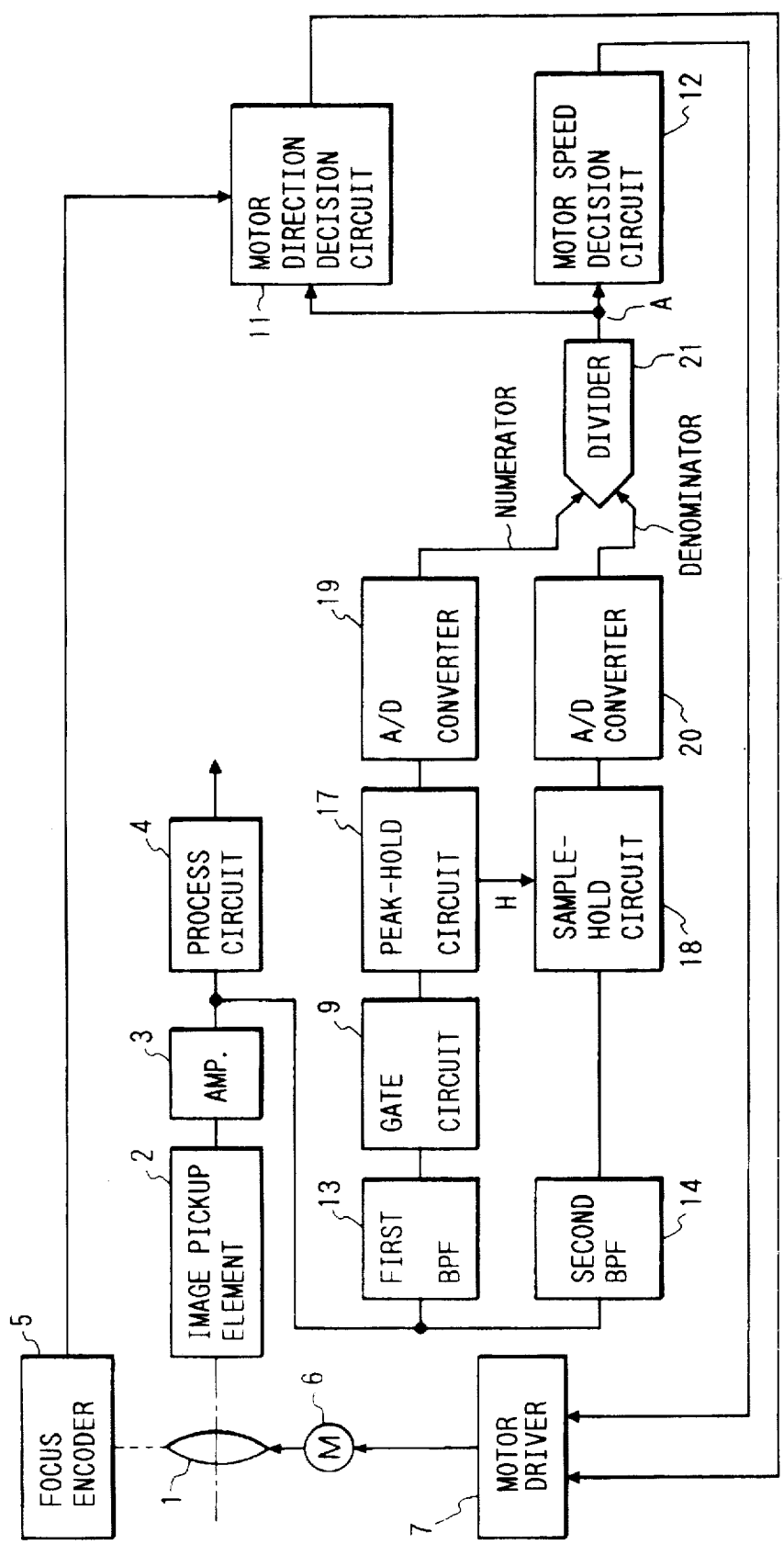
FIG. 2 is a block diagram illustrating a first embodiment for an AF system according to the present invention.

Referring now to FIG. 2 in which the construction of the first embodiment is diagrammatically illustrated in a block form, the same reference numerals are provided to the same or similar constituents as used in FIG. 1, and the explanation therefor is omitted.

The video signal amplified up to the desired level at the amplifier 3 is supplied to a first BPF 13 and a second BPF 14. It should be noted that the transit center frequency of the second BPF 14 is lower than that of the first BPF 13 and only a specific frequency is extracted at the first BPF 13. In the gate circuit 9, only the signal corresponding to the portion set in a focal point detection region within a scene is extracted, and applied to a peak-hold circuit 17. Similarly, the output of the second BPF 14 which is lower in level than that of the first BPF 13 is inputted into a sample-hold circuit 18.

The peak-hold circuit 17 holds a value that becomes maximum during one vertical operation period and provides to the sample-hold circuit 18 a timing signal H used for holding its value. The sample-hold circuit 18 holds data to a peak-hold timing signal H of the peak-hold circuit 17. In short, the holding value of the peak-hold circuit 17 and the holding value of the sample-hold circuit 18 correspond to different frequency components extracted at the same point within the video signal. The outputs of the peak-hold circuit 17 and the sample-hold circuit 18 are analog-digital converted at A/D converters 19 and 20, respectively, and then inputted into a divider 21.

The divider 21 implements digital operation simultaneously with the end of a vertical scanning period, provided that the output C (the value extracted from the higher frequency) of the A/D converter 19 is used as the numerator and the output D (the value extracted from the lower frequency) of the A/D converter 20 is used as the denominator, and outputs the result of the digital operation as evaluation value A for the degree of focusing every vertical scanning period. This evaluation value A is inputted into the motor direction decision circuit 11 and the motor speed decision circuit 12. The motor direction decision circuit 11 discriminates the motor direction using the evaluation value A, and transmits the result of its discrimination to the motor driver 7. The motor speed decision circuit 12 determines the speed of motor 6 so that it is proportional to the reciprocal of the evaluation value A and transmits it to the motor driver 7. In short, when the evaluation value A is low and far apart from the focusing point, the speed of motor 6 is made fast. And, when the evaluation value A is high and is close to the focusing point, the speed of motor 6 is made slow.

The motor driver 7 drives the focusing motor 6 in conformity with the prescribed speed and direction of the motor 6 to control the focusing lens 1, thereby attaining the automatic focusing operation.

Figure 3:
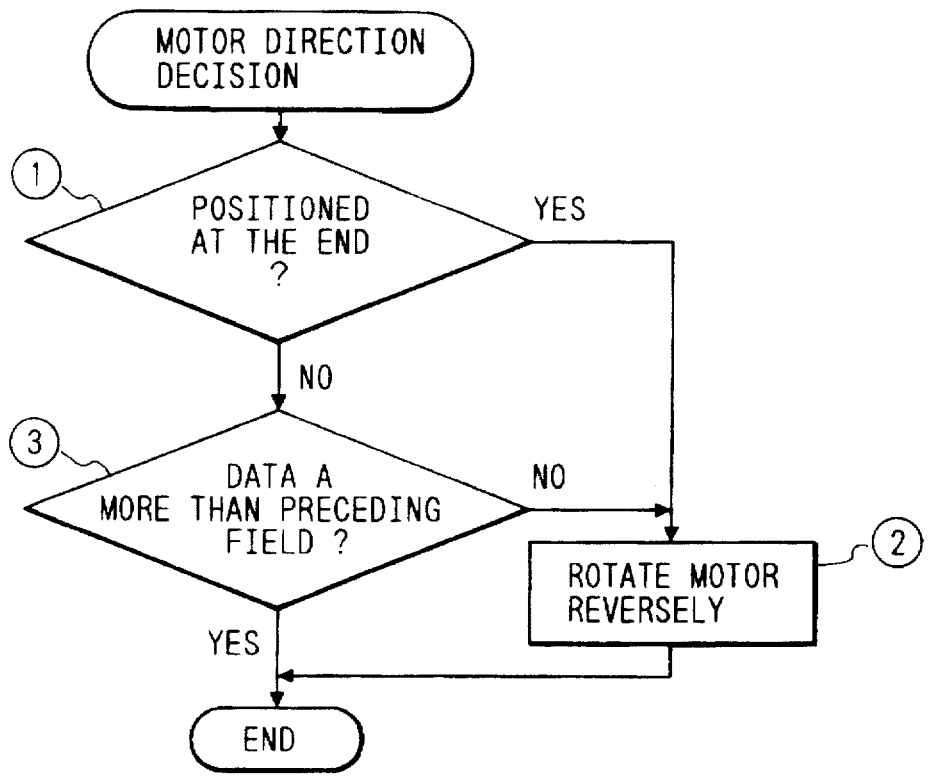
FIG. 3 is a flow chart showing the operation of a motor direction decision circuit in the AF system of FIG. 2.

Operation of the motor direction decision circuit 11 will be explained herein by referring to a flow chart in FIG. 3. First of all, it is checked, at the motor direction decision circuit 11 based on the input from the focus encoder 5, whether or not the motor 6 is positioned at its extreme end (Step 1). If it is, the driving direction of the motor 6 is reversed (Step 2). If it is not, it is judged by comparison with the data A' of the preceding field whether the data A is increasing (Step 3). As the result, if it is decreasing, the direction of motor 6 is reversed, and if it is increasing, the same direction will be maintained.

Figure 4:
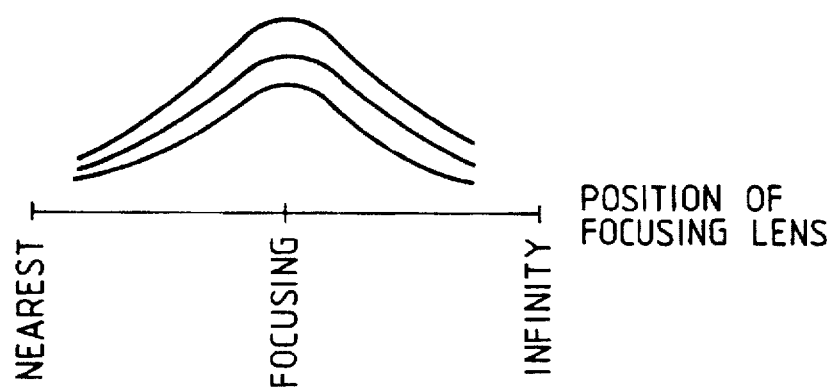
FIG. 4 is a diagram showing characteristics of an evaluation value A used in the AF system of FIG. 2.
Figure 5:
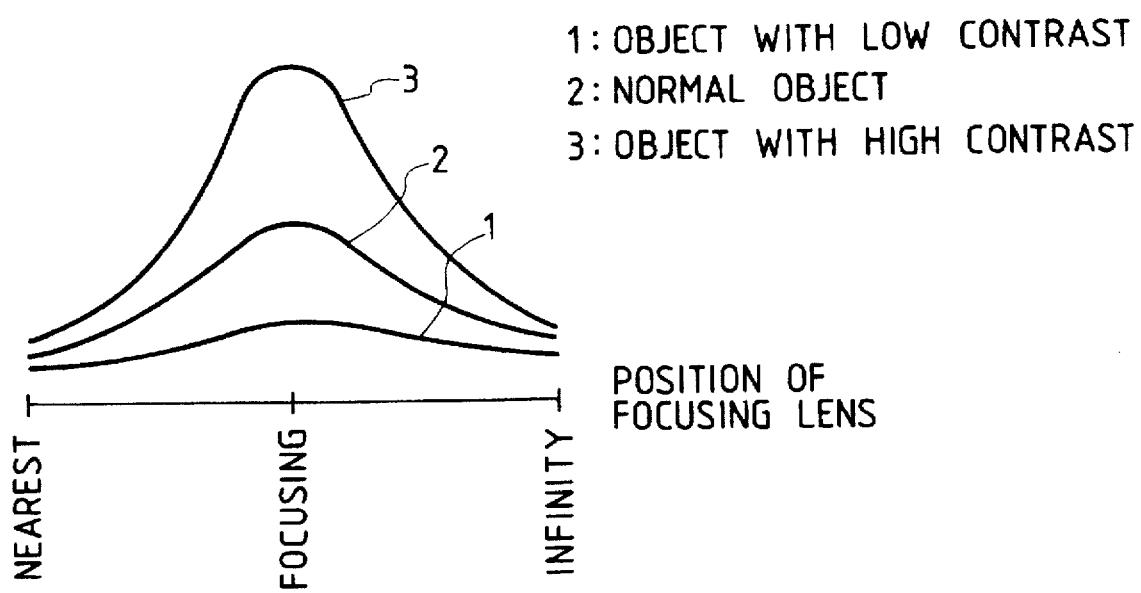
FIG. 5 is a diagram showing characteristics of a focal point voltage B used in the AF system of FIG. 1.

Next, the difference between the evaluation value (FIG. 4) in the first embodiment and the focal point voltage B (FIG. 5) in the conventional example of FIG. 1 will be explained by referring to FIGS. 4 and 5. As will be seen from FIG. 5, the focal point voltage B is comparatively low even in the case of an object with low contrast, but becomes high in the case of an object with high contrast. However, as indicated in FIG. 4, the evaluation value A in the first embodiment becomes approximately constant independently of the contrast of the object.
(Embodiment: 2)

Figure 6:
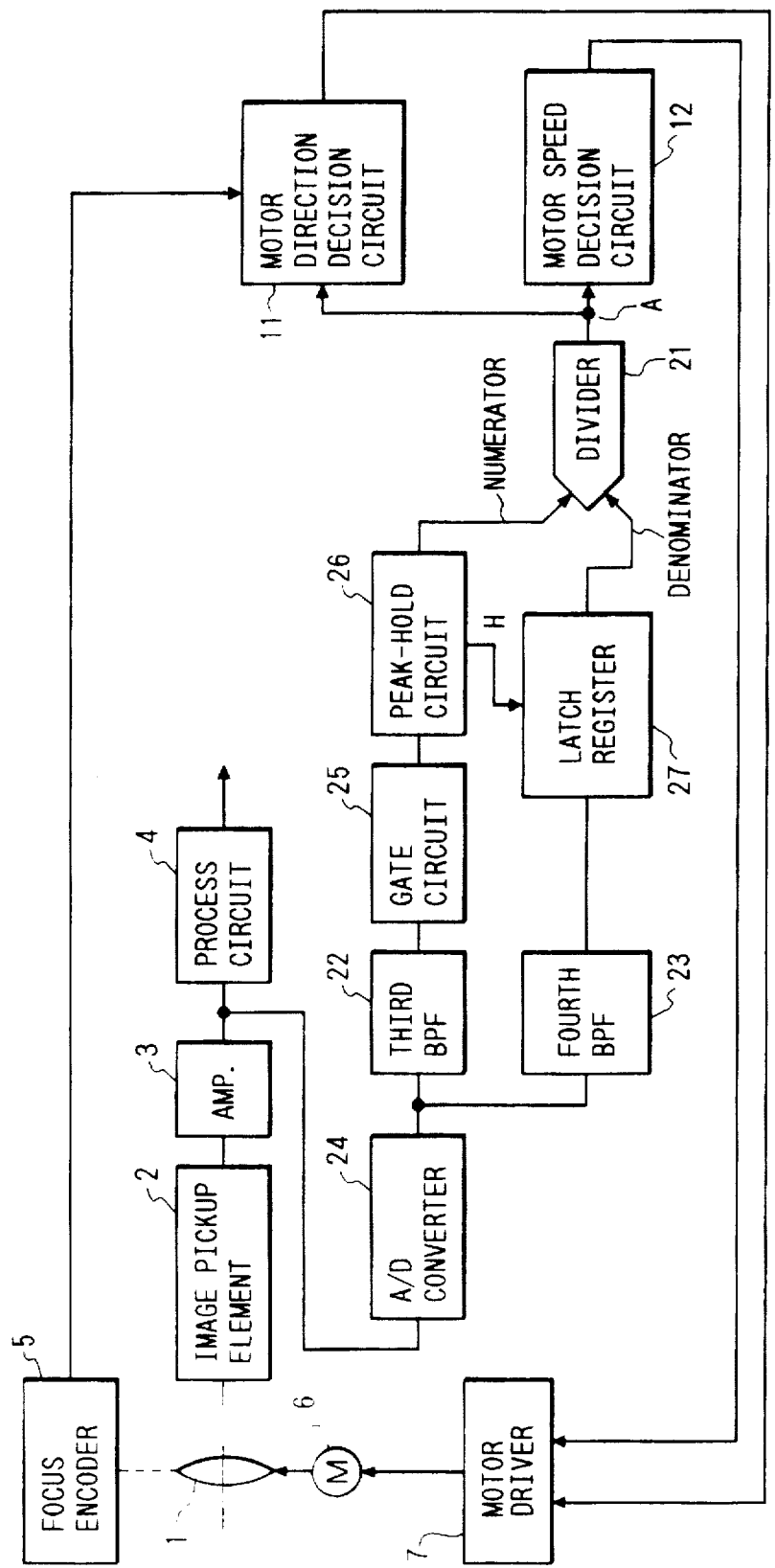
FIG. 6 is a block diagram illustrating a second embodiment of the present invention.

FIG. 6 is a block diagram showing the construction of the second embodiment.

In the same manner as described in the first embodiment, the video signal amplified up to the desired level at the amplifier 3 is first converted into digital data at an A/D converter 24. This digital data is filtered by a next third BPF 22 and a fourth BPF 23 respectively, to extract the specific frequency components.

At this juncture, the frequency characteristics attained by BPF 22 and BPF 23 are almost the same as that attained by the first BPF 13 and the second BPF 14 in the case of the first embodiment. Then, a gate circuit 25 extracts digital data only in the focal point detection region, and a peak-hold circuit 26 holds the maximum value from the BPF 22 during the vertical scanning period. Simultaneously with this, a latch register 27 holds the value from the BPF 23 according to a peak-hold pulse H provided by the peak-hold circuit 26. In this way, automatic focusing operation similar to that in the first embodiment will be performed.
(Embodiment: 3)

Figure 7:
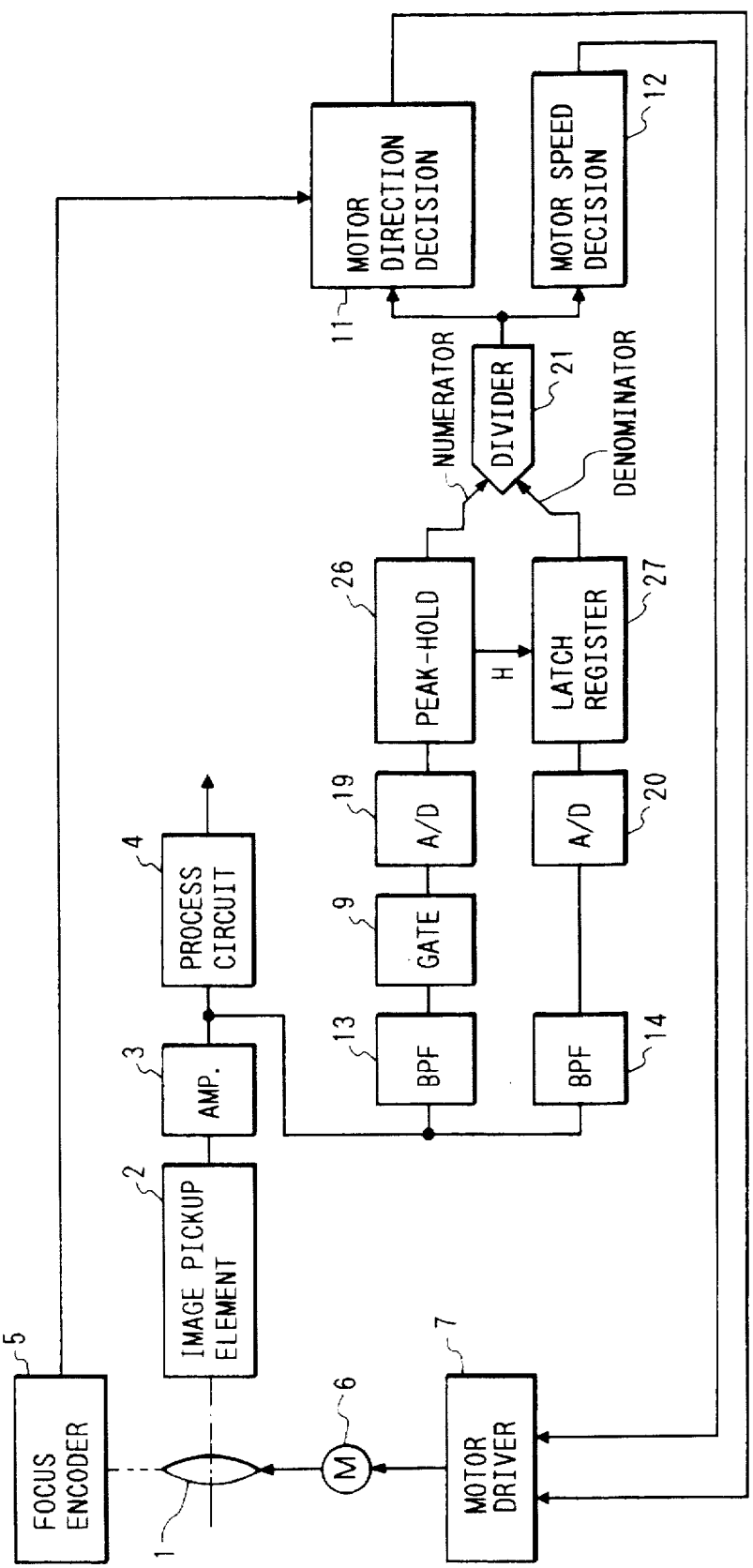
FIG. 7 is a block diagram illustrating a third embodiment of the present invention.

Referring to FIG. 7, there is illustrated a third embodiment of the present invention, in which an analog filter is used as BPF. For this purpose, this embodiment has been constituted by disposing the A/D converters 19 and 20 in the first embodiment in the preceding stages of peak-hold circuit 17 and sample-hold circuit 18. As the result, a peak-hold circuit 26 and a data latch register 27 are constituted as digital circuits in order to process digital data. The remaining operation is similar to that in the respective embodiments described above.

As explained above, according to the present invention, rapid focusing operation without hunting is made possible, regardless of the type of object, by deciding the driving direction of the focusing lens on the basis of the signal extracted from among the image pickup signals by means of the plurality of the extraction means, detecting the focusing signal in correspondence with the degree of focusing through division in respect of the extracted signals, determining the driving speed of the focusing lens based on the detected focusing signal, and driving the focusing lens toward the focusing point.

(Embodiment: 4)

In this part of the application, there will be explained a fourth embodiment of the present invention in which the performance on judgement of the driving direction and the speed of the focusing motor is improved over the systems in the above-mentioned first, second and third embodiments.

Figure 8:
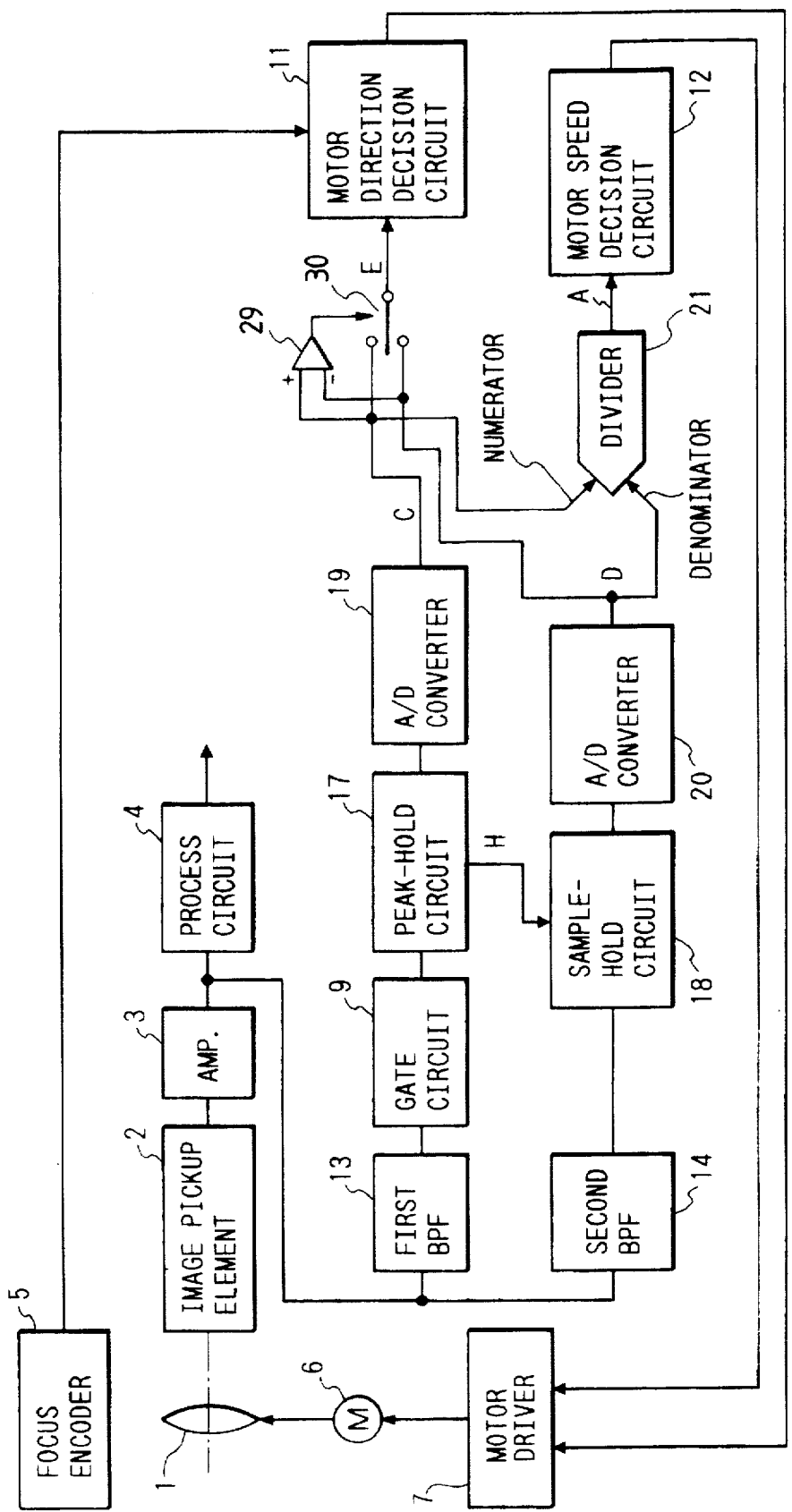
FIG. 8 is a block diagram illustrating a fourth embodiment of the present invention.

In FIG. 8, there is shown a system block diagram of a fourth embodiment, in which the same constituents as that illustrated in the first embodiment of FIG. 2 are indicated by the same reference numerals, so that there is no detailed explanation therefor. According to this embodiment, the divider 21 implements digital operation upon the end of the vertical scanning period on condition that the output C (the value extracted from higher frequencies) of the A/D converter 19 is used as the numerator and the output D (the value extracted from lower frequencies) of the A/D converter 20 is used as the denominator, and outputs it as evaluation value A for the degree of focusing every vertical scanning period, all the operation described above being just the same as that shown in FIG. 2. This evaluation value A is inputted into the motor speed decision circuit 12. Then, the motor speed decision circuit 12 determines the speed of motor 6 so that it is proportional to the reciprocal of the evaluation value A and transmits it to the motor driver 7. In short, when the evaluation value A is low and is far apart from the focusing point, the speed of motor 6 is made fast, and when the evaluation value A is high and is close to the focusing point, the speed of motor 6 is made slow.

In addition, the output C of the A/D converter 19 and the output D of the A/D converter 20 are compared at a comparator 29 to obtain a signal to be used for controlling a switch 30. As the result, the switch 30 selects the greater of the two outputs C and D, which is entered, as data E, into the motor direction decision circuit 11. The motor direction decision circuit 11 determines the direction of motor 6 using the data E and the input from the focus encoders 5, and transmits to the motor driver 7.

The motor driver 7 drives the focusing motor 6 to the specified speed and direction to adjust the focusing lens 1, thereby attaining automatic focusing operation.

Figure 9:
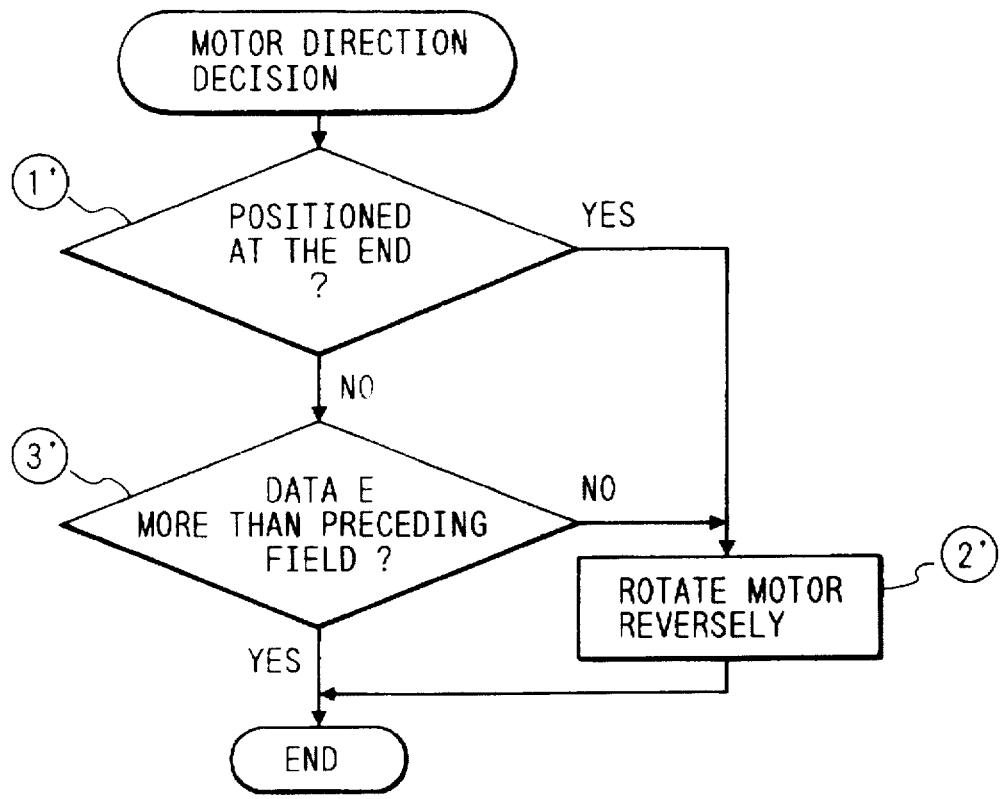
FIG. 9 is a flow chart showing the operation of a motor direction decision circuit in the system of FIG. 8.

The operation of the motor direction decision circuit 11 will be explained by reference to a flow chart of FIG. 9. To begin with, the motor direction decision circuit 11 checks whether the motor is positioned at its extreme end, based on the input from the focus encoder 5 (Step 1'). If it is, the direction of motor 6 is reversed (Step 2'). If it is not, Step 3' checks whether the data E is increasing, by the comparison with the data E' of the preceding field. If it is decreasing, the direction of motor 6 is reversed (Step 2' ), and if it is increasing, the same direction will be maintained.

The difference between the estimation value in the instant embodiment and the focal point voltage B of prior art in FIG. 1 is just the same as described previously with reference to FIGS. 4 and 5. As recalled, the focal point voltage B in the case of an object with low contrast remains low, but it becomes larger in the case of an object with high contrast. On the other hand, the evaluation value A of the fourth embodiment is kept almost constant independently of a wide range of contrast of the object.

Figure 10:
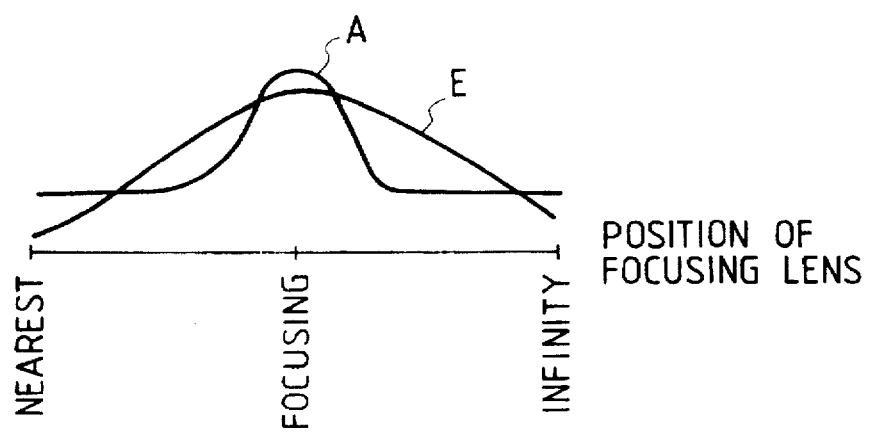
FIG. 10 is a diagram showing characteristics of an evaluation value A and data E in the system of FIG. 8.

Referring to FIG. 10, there is shown the difference between the evaluation value A and the data E. Assume herein that the same object is to be photographed, the degree of focusing may be distinguished from the evaluation value A, but the output does not vary when the object is out of focus excessively. Contrary to this, in the case of data E, the value at the focusing point varies largely depending on the object, but a slope of a mountainous curve may be definitely detected even when the object is out of focus excessively. Accordingly, it will be understood that the evaluation value A is suited for speed control of the motor 6 and the data E is suited for direction control of the motor 6.

(Embodiment: 5)

Figure 11:
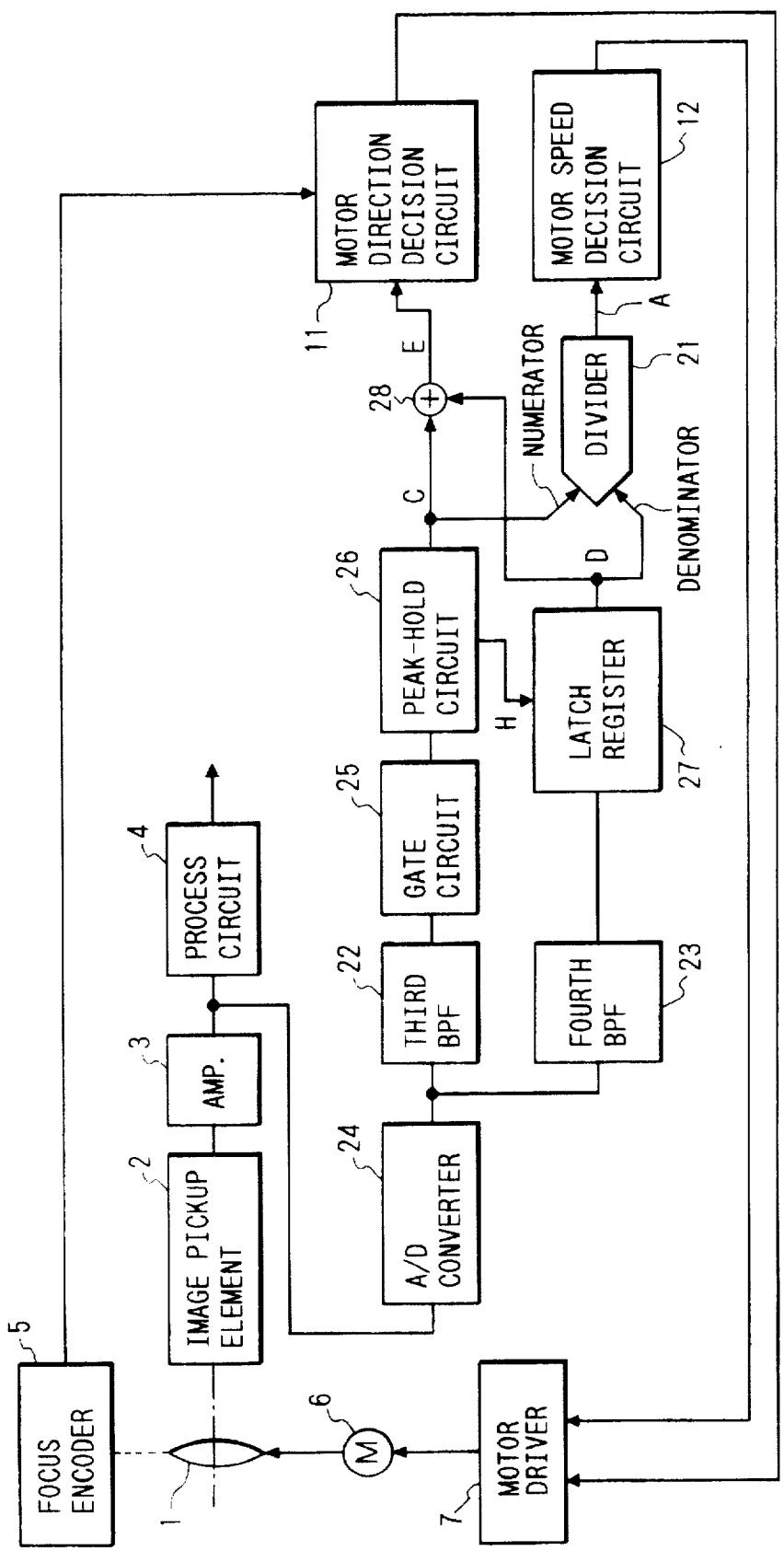
FIG. 11 is a block diagram demonstrating a fifth embodiment of the present invention.

FIG. 11 is a block diagram showing a construction of a fifth embodiment.

In the same manner as described in connection with the fourth embodiment, the video signal amplified up to the desired level at the stage of the amplifier 3 is converted into digital data at the A/D converter 24. This digital data is filtered by the third BPF 22 and the fourth BPF 23 to extract only the specific frequency components.

In this process, frequency characteristics attained by the BPF 22 and the BPF 23 are almost the same as that attained by the first BPF 13 and the second BPF 14 used in the first embodiment. And then, the gate circuit 25 extracts only the digital data in the focal point detection region, and the peak-hold circuit 26 holds the maximum value of BPF 22 during one vertical scanning period. Simultaneously with this, the latch register 27 holds the value from the BPF 23 according to the peak-hold pulse H supplied from the peak-hold circuit 26.

The output C of the peak-hold circuit 26 and the output D of the latch register 27 are added to each other at an adder 28 and the sum is supplied to the motor direction decision circuit 11. The direction decision capability of the output E of adder 28 can be further improved by adding a plurality of filter outputs thereto, even in the case of excessive defocusing. The motor speed decision circuit 12 receives the evaluation value A that is obtained by dividing the output C of peak-hold circuit 26 by the output D of latch register 27 at the divider 21. Finally, the automatic focusing operation will be performed in the same manner as described relative to the first embodiment.

As explained above, according to the present invention, rapid focusing operation without hunting is made possible, regardless of the type of object, by deciding the driving direction of the focusing lens on the basis of the signal extracted from among the image pickup signals by means of the plurality of the extraction means, detecting the focusing signal in correspondence with the degree of focusing through division in respect of the extracted signals, determining the driving speed of the focusing lens based on the detected focusing signal, and driving the focusing lens toward the focusing point.

What is claimed is:

1. An automatic focusing device comprising:
    (A) image pickup means for outputting an image pickup signal;
    (B) extraction means for simultaneously extracting from the image pickup signal outputted by said image pickup means a first and a second frequency components at a point in a focus detecting area defined on an image screen in a same field or frame, said first and second frequency components being different from each other;

(C) detection means for detecting a focusing condition on the basis of a result of computation of a ratio between the first and second frequency components, extracted by said extraction means; and (D) focusing means for performing a focusing operation based on the ratio output from said detection means.

2. An automatic focusing device according to claim 1, wherein said extraction means includes a plurality of band-pass filters for extracting a plurality of signal components having transit center frequencies different from each other within the image pickup signals, and filters therefor.

3. An automatic focusing device according to claim 2, wherein said extraction means includes a timing generation means for detecting the level of frequency components at an identical point within said image pickup signals by use of said respective band-pass filter.

4. An automatic focusing device according to claim 3, said extraction means includes a peak-hold circuit for detecting a peak value in the output of one of said band-pass filters, and said timing generation means includes a sample-hold circuit for sampling and latching the output of the other of said band-pass filters at the timing that has been used by said peak-hold circuit for detecting the peak value.

5. An automatic focusing device according to claim 1, wherein said focusing means includes a focusing lens, and a focusing motor for driving said focusing lens.

6. An automatic focusing device according to claim 5, wherein said focusing means includes a direction decision circuit for determining the driving direction of said focusing lens, and a speed decision circuit for deciding the driving speed of said focusing lens.

7. An automatic focusing device comprising:

(A) image pickup means for photoelectrically converting an image of object image-formed on an image pickup plane and outputting it as an image pickup signal;

(B) extraction means including a plurality of bandpass filters for simultaneously extracting, from the image pickup signal outputted by said image pickup means, a first signal component corresponding to a point in a focus detecting area defined on said image pickup plane and a second signal component corresponding to said point in said focus detecting area, said second signal component having frequency components different from frequency components of said first signal component;

(C) detection means for detecting a focusing condition by performing an arithmetic operation for obtaining a ratio between the first and second signal components extracted by said extraction means; and (D) focusing means for performing a focusing operation based on the ratio output from said detection means.

8. An automatic focusing device according to claim 7, wherein said detection means carries out division in respect of said first and second frequency components.

9. An automatic focusing device according to claim 8, wherein said detection means divides the signal component having higher frequency of said first and second signal components by the signal component having lower frequency thereof and normalizes the signal component having higher frequency by using the signal component having lower frequency.

10. An automatic focusing device according to claim 9, said extraction means includes timing generation means for detecting the level of the frequency components in an identical point within said image pickup signals by said respective band-pass filter.

11. An automatic focusing device according to claim 10, said extraction means includes a peak-hold circuit for detecting a peak value in the output of one of said band-pass filters, and said timing generation means includes a sample-hold circuit for sampling and latching the output of the other of said band-pass filters at the timing that has been used by said peak-hold circuit for detecting the peak value.

12. An automatic focusing device according to claim 7, wherein said focusing means includes a focusing lens, a focusing motor for driving said focusing lens, a direction decision circuit for determining the driving direction of said focusing lens, and a speed decision circuit for judging the driving speed of said focusing lens.

13. An automatic focusing device according to claim 10, wherein said focusing means includes a focusing lens, a focusing motor for driving said focusing lens, a direction decision circuit for determining the driving direction of said focusing lens, and a speed decision circuit for judging the driving speed of said focusing lens.

14. An automatic focusing device comprising:

(A) image pickup means for outputting an image pickup signal;

(B) extraction means for simultaneously extracting from the image pickup signal outputted by said image pickup means a first frequency component at a point in a focus detecting area defined on an image pickup plane of said image pickup means and a second frequency component at said point in said focus detecting area, said second frequency component being different from said first frequency component;

(C) direction decision means for deciding a focusing direction based on a result of computation of a ratio between the first and second frequency components extracted by said extraction means;

(D) speed decision means for determining a focusing speed on the basis of the ratio of the signals having said respective frequency components extracted by said extraction means; and (E) focusing means for performing focusing operation based on the output of said direction decision means and said speed decision means.

15. An automatic focusing device according to claim 14, wherein said extraction means includes a plurality of band-pass filters for extracting a plurality of signal components having transit center frequencies different from each other within the image pickup signals, and filters therefor.

16. An automatic focusing device according to claim 15, wherein said extraction means includes timing generation means for detecting the level of frequency components at an identical point within said image pickup signals by means of said respective band-pass filter.

17. An automatic focusing device according to claim 16, wherein said extraction means includes a peak-hold circuit for detecting a peak value in the output of one of said band-pass filters, and said timing generation means includes a sample-hold circuit for sampling and latching the output of the other of said band-pass filters at the timing that has been used for detecting the peak value by means of said peak-hold circuit.

18. An automatic focusing device according to claim 16, wherein said speed decision means performs judgement of speed on the basis of the information obtained from division on the output of said respective band-pass filter.

19. An automatic focusing device according to claim 18, wherein said direction decision means performs judgement of direction on the basis of the output signal with higher level of said respective band-pass filter.

20. An automatic focusing device according to claim 14, wherein said focusing means includes a focusing lens, and a focusing motor for driving said focusing lens.

21. An automatic focusing device comprising:
   (A) image pickup means for photoelectrically converting an image of object image formed on an image pickup plane, and outputting it as an image pickup signal;
   (B) extraction means for simultaneously extracting from the image pickup signal outputted by said image pickup means, a first signal component at a point in a focus detecting area defined on said image pickup plane and a second signal component at said point in said focus detecting area in the same field, said first and second signal components being different from each other in their respective frequency characteristics and being subject to variation depending on focal point conditions;
   (C) detection means for detecting a focusing condition on the basis of a result of computing a ratio of the first and second signal components extracted by said extraction means; and
   (D) focusing means for performing focusing operation on the basis of the ratio output from said detection means.

22. An automatic focusing device according to claim 21, said first and second signal components are a plurality of signal components having transit center frequencies different from each other within the image pickup signals.

23. An automatic focusing device according to claim 22, wherein said extraction means includes a plurality of band-pass filters for extracting the first and second signal components, a peak-hold circuit for detecting a peak value in the output of one of said band-pass filter, a sample-hold circuit for sampling and latching the output of the other of said band-pass filters at the timing that has been used for detecting the peak value by means of said peak-hold circuit.

24. An automatic focusing device according to claim 23, wherein said detection means detects a focusing condition on the basis of the information obtained from division on the output of said respective band-pass filter.

25. An automatic focusing device according to claim 24, said detection means detects a focusing condition on the basis of the information obtained by dividing the output with higher transit frequencies of said band-pass filter by the output with lower transit frequencies thereof.

26. An automatic focusing device according to claim 21, wherein said detection means includes a direction decision means for judging the direction of the focusing lens, and a speed decision means for judging the speed thereof.

27. An automatic focusing device comprising:
   (A) image pickup means for outputting an image pickup signal which includes plural image signal fields each representing a respective image;
   (B) extraction means for extracting from an image signal field of said image pickup signal a first signal frequency component at a point in said image signal field in a focus detecting area and a second signal frequency component at said point in said image signal field, said first and second signal frequency components being different from each other, and said extraction means outputting respective component signal values corresponding to the first and second signal frequency components simultaneously extracted at said point in said same image signal field;
   (C) detection means for performing a computation for obtaining a ratio of the first and second frequency components on the basis of said respective component signal values outputted by said extraction means and for detecting a focusing condition based on a result of said computation; and
   (D) focusing means responsive to said detection means, for performing a focusing operation on the basis of the focusing condition detected by said detection means.

28. An automatic focusing device according to claim 27, wherein said extraction means includes a first band-pass filter for extracting the first signal frequency component and a second band-pass filter for extracting the second signal frequency component, said first and second band-pass filters having respective pass bands that are different from each other.

29. An automatic focusing devise according to claim wherein said extraction means includes a peak-hold circuit for detecting a peak value of the first signal frequency component within a focus detection region of the image represented by said image signal field and also includes means for sampling and latching the second signal frequency component at a point of said focus detection region corresponding to said peak value of the first signal frequency component.

30. An automatic focusing device according to claim 28, wherein said detection means divides the component signal value corresponding to the first signal frequency component by the component signal value corresponding to the second signal frequency component.

31. An automatic focusing device according to claim 30, wherein the pass band of the first band-pass filter has a center frequency that is higher than a center frequency of the pass band of the second band-pass filter.

32. An automatic focusing device according to claim 27, wherein said focusing means includes a focusing lens, and a focusing motor for driving said focusing lens.

33. An automatic focusing device according to claim 32, wherein said focusing means includes a direction decision circuit for determining a direction in which the focusing lens is to be driven, and a speed decision circuit for determining a speed at which the focusing lens is to be driven.

34. An automatic focusing device comprising:
   (A) image pickup means for outputting an image pickup signal;
   (B) extraction means for extracting from a portion of said image pickup signal corresponding to a focus detection region defined on an image screen a peak value of a first signal frequency component within said region in a field, said extraction means simultaneously extracting from said portion of said image pickup signal a second signal frequency component at a point in said focus detection region which corresponds to said peak value of the first signal frequency component in the same field, said first and second signal frequency components being different from each other, said extraction means outputting respective component signal values corresponding to the extracted first and second signal frequency components;
   (C) detection means for performing a computation for obtaining a ratio of said first and second signal frequency components on the basis of said respective component signal values outputted by said extraction means and for detecting a focusing condition based on a result of said computation; and (D) focusing means responsive to said detection means, for performing a focusing operation on the basis of the focusing condition detected by said detection means.

35. An automatic focusing device according to claim 34, wherein said extraction means includes a first band-pass filter for extracting the first signal frequency component and a second band-pass filter for extracting the second signal frequency component, said first and second band-pass filters having respective pass bands that are different from each other.

36. An automatic focusing device according to claim 35, wherein said detection means divides the component signal value corresponding to the first signal frequency component by the component signal value corresponding to the second signal frequency component.

37. An automatic focusing device according to claim 36, wherein the pass band of the first band-pass filter has a center frequency that is higher than a center frequency of the pass band of the second band-pass filter.

38. An automatic focusing device according to claim 34, wherein said focusing means includes a focusing lens, and a focusing motor for driving said focusing lens.

39. An automatic focusing device according to claim 38, wherein said focusing means includes a direction decision circuit for determining a direction in which the focusing lens is to be driven, and a speed decision circuit for determining a speed at which the focusing lens is to be driven.

* * * * *